(12) United States Patent
Kartchner

(10) Patent No.: US 7,437,167 B2
(45) Date of Patent: Oct. 14, 2008

(54) APPARATUS, SYSTEM, AND METHOD FOR LOCATING A TRANSCEIVER USING RF COMMUNICATIONS AND RADIO SERVICES

(76) Inventor: Steve Gene Kartchner, 2546 S. 1500 East, Salt Lake City, UT (US) 84106

( * ) Notice: Subject to any disclaimer, the term of this patent is extended or adjusted under 35 U.S.C. 154(b) by 484 days.

(21) Appl. No.: 10/732,630

(22) Filed: Dec. 10, 2003

(65) Prior Publication Data

US 2004/0121822 A1 Jun. 24, 2004

Related U.S. Application Data

(60) Provisional application No. 60/432,153, filed on Dec. 10, 2002.

(51) Int. Cl.
*H04M 1/00* (2006.01)

(52) U.S. Cl. ............... 455/456.1; 455/456.6; 455/45.6

(58) Field of Classification Search ............... 455/410, 455/404.1, 404.2, 67.13, 456.1, 456.2, 456.3, 455/456.5, 552.1, 456.6, 3.06, 411, 414.2, 455/414.3, 45.6, 457; 713/169, 201; 379/37, 379/45; 709/200
See application file for complete search history.

(56) References Cited

U.S. PATENT DOCUMENTS

| | | | |
|---|---|---|---|
| 3,478,344 A | 11/1969 | Schwitzgebel et al. ...... | 340/312 |
| 3,518,674 A | 6/1970 | Moorehead et al. ......... | 343/112 |
| 4,593,273 A | 6/1986 | Narcisse ..................... | 340/539 |
| 4,598,272 A | 7/1986 | Cox ........................... | 340/539 |
| 4,694,284 A | 9/1987 | Leveille et al. ............... | 340/574 |
| 4,785,291 A | 11/1988 | Hawthorne .................. | 340/573 |
| 4,918,425 A | 4/1990 | Greenberg et al. ........... | 340/539 |
| 5,021,794 A | 6/1991 | Lawrence .................... | 342/457 |
| 5,329,591 A * | 7/1994 | Magrill ....................... | 455/410 |
| 5,357,254 A | 10/1994 | Kah, Jr. ....................... | 342/42 |
| 5,512,879 A | 4/1996 | Stokes ........................ | 340/573 |
| 5,589,821 A | 12/1996 | Sallen et al. ................. | 340/573 |
| 5,646,593 A | 7/1997 | Hughes et al. ............... | 340/573 |
| 5,661,460 A | 8/1997 | Sallen et al. ................. | 340/573 |
| 5,870,672 A * | 2/1999 | Stoddard et al. ............. | 455/410 |
| 5,893,031 A * | 4/1999 | Hoogerwerf et al. ......... | 455/410 |
| 5,905,949 A * | 5/1999 | Hawkes et al. ............... | 455/410 |
| 6,067,018 A | 5/2000 | Skelton et al. ............ | 340/573.3 |
| 6,265,974 B1 | 7/2001 | D'Angelo et al. ............ | 340/568 |
| 6,563,427 B2 | 5/2003 | Bero et al. ................ | 340/573.1 |
| 6,593,851 B1 | 7/2003 | Bornstein .............. | 340/539.15 |
| 6,624,754 B1 | 9/2003 | Hoffman et al. .......... | 340/573.1 |

(Continued)

*Primary Examiner*—Charles N Appiah
*Assistant Examiner*—Joy K. Contee
(74) *Attorney, Agent, or Firm*—Kunzler & McKenzie

(57) ABSTRACT

An apparatus, system, and method are provided for locating a transceiver using RF communications and radio services. The apparatus, system, and method include a transceiver that receives an RF signal, decodes a serial number, and responds by transmitting either a low power signal with a unique identification code and location information, or a high power signal with a station identifier received from the RF signal and location information. The high power signal is transmitted in response to a licensed radio operator (such as a HAM, police, etc.) and is transmitted using the licensed radio operator's station identifier. Since the licensed radio operator is the control operator, the current invention may be owned and operated by the general public without a special license. The current invention allows a mobile transceiver to provide a greatly expanded transmission range that enhances the probability of locating the transceiver.

28 Claims, 6 Drawing Sheets

U.S. PATENT DOCUMENTS

| | | | |
|---|---|---|---|
| 6,725,050 B1 * | 4/2004 | Cook | 455/456.1 |
| 6,853,849 B1 * | 2/2005 | Tognazzini | 455/457 |
| 6,885,869 B2 * | 4/2005 | Raith | 455/456.6 |
| 2002/0036569 A1 | 3/2002 | Martin | 340/573.1 |
| 2002/0175820 A1 | 11/2002 | Oja et al. | 340/573.4 |
| 2002/0186135 A1 | 12/2002 | Wagner | 340/573.1 |
| 2003/0051140 A1 * | 3/2003 | Buddhikot et al. | 713/169 |
| 2003/0063003 A1 | 4/2003 | Bero et al. | 340/573.1 |
| 2003/0122684 A1 | 7/2003 | Porter et al. | 340/686.6 |
| 2005/0013417 A1 * | 1/2005 | Zimmers et al. | 379/37 |
| 2006/0275040 A1 * | 12/2006 | Franklin | 398/172 |
| 2006/0276209 A1 * | 12/2006 | Neves et al. | 455/466 |

* cited by examiner

APPARATUS, SYSTEM, AND METHOD FOR LOCATING A TRANSCEIVER USING RF COMMUNICATIONS AND RADIO SERVICES

CROSS-REFERENCES TO RELATED APPLICATIONS

This application claims priority to U.S. Provisional Patent Application No. 60/432,153 entitled "System and Device for Locating Missing Children Using RF Communications and Amateur Radio" and filed on Dec. 10, 2002 for Steve Kartchner.

BACKGROUND OF THE INVENTION

1. Field of the Invention

This invention relates to radio frequency and wireless communications and more particularly relates to how a radio frequency device can serve to locate a transceiver.

2. Description of the Related Art

In order for Radio Frequency (RF) devices to be useful, there must be a means of superimposing information on a transmitted radio wave and subsequently extracting the information from a received radio wave. Typically, an RF transmitter selects a particular frequency as a carrier and modulates information on the carrier. An RF receiver usually tunes a selection filter to the carrier frequency and detects information by determining a change of frequency or amplitude of the carrier. It is well known that if multiple transmitters select the same frequency as a carrier, signal interference will result. This interference often makes detection of information difficult or impossible. Uncontrolled access to the radio frequency spectrum would flood the airways with interference and ultimately make radio frequency devices unusable.

For this reason, international treaties were signed that require national governments around the world to regulate and control public access to the radio frequency spectrum. Free access to the radio spectrum is only allowed at extremely low power levels to insure that transmitters operated by the general public do not interfere with other radio frequency devices that could be on the same or adjacent frequencies.

Rules and regulations are clear about what types of devices and what types of communications are allowed on each frequency band. For example, there are two citizen bands (CB) in the United States of America where devices can be used for public communications. CB radios are often used by truck drivers as they travel throughout the United States. Walkie-talkies in these bands may be used by a parent or guardian to maintain contact with a child old enough to understand how to use such a device.

The general public is authorized to freely use many frequency bands if the transmission power level is limited to a low power. Garage door openers and automobile door lock controls are examples of low power public use of the RF spectrum. Because of the mandated RF transmitter power restrictions, the useful range of these public-use devices is severely limited. Licenses may be obtained to use higher power transmitters in certain frequency bands. For example, amateur radio (HAM) licenses are granted based upon passing certain tests and demonstrating proficiency in certain communication skills.

Location using RF communications has been practiced for many years. For example, research has been conducted on the migratory habits of birds by using RF transmitters attached to the birds and RF receivers equipped with directional antennas. Generally, these devices transmit on a regulated frequency band. Difficulties with location tracking using RF devices are generally associated with the mobile transmitter range. If a receiver cannot receive communication due to distance, obstructions, or interference, then bearing and distance cannot be established. The range of a tracking device is typically dependent on transmitter power, and transmitter power is generally dependant on an available power source and applicable government regulations for the selected frequency band.

For example, when a mobile transmitter is miniaturized to permit attachment to a child or small animal, the limited life of a small battery may limit the number of transmission messages and transmission power level. A tradeoff is usually made between decreasing the transmission power to increase battery life and increasing the transmission power to the extent possible under applicable regulations, to extend the transmit range.

FIG. 1 is a schematic block diagram illustrating a typical prior art RF tracking system 100. The RF tracking system 100 includes a mobile RF device 110 and a companion RF device 140. An obstruction 170 may prevent line-of-sight communication between the mobile RF device 110 and the companion RF device 140.

In a simple system, the mobile RF device 110 may be a transmitter with transmit range 120 and the companion RF device 140 may be a receiver with reception range 160. A transmit range 120 may be dependent on transmitter power, antenna design, and the like while the reception range 160 may be dependent on interference, obstructions 170, antennae design, and so forth. The interaction between the transmit range 120 and the reception range 160 is called the communication range. The companion RF device 140 may track the location of the mobile RF device 110 if the communication range spans the separation distance between the devices. An obstruction 170 may decrease the communication range. It is desirable to increase the transmit range 120 of the mobile RF device 110 as much as possible.

A difficulty with the simple RF tracking system 100 is that the mobile RF device 110 may be unaware whether the companion RF device 140 is within communication range. In the simple RF tracking system 100, the mobile RF device 110 may transmit continuously in an attempt to communicate with the companion RF device 140 until the mobile power source is exhausted. The transmission power may initially be high due to a fully charged power source and gradually decrease as the power source becomes discharged. If the companion RF device 140 does not locate the mobile RF device 110 or enter the communication range before the power source is exhausted, the system 100 fails. Decreasing the transmit range 120 by decreasing the transmit power may increase the available transmission time, but may also decrease the probability that the companion RF device 140 is within communication range.

In a more complex system, the mobile RF device 110 may be a transceiver with transmit range 120 and reception range 130, and the companion RF device 140 may be a transceiver with transmit range 150 and reception range 160. The companion RF device 140 may track the mobile RF device 110 by transmitting a signal to the mobile RF device 110, which in turn transmits a signal with location information to the companion device 140. An advantage of this approach is that the mobile RF device 110 may conserve power by waiting to transmit until it is likely that the companion RF device 140 is within communication range.

A complexity introduced with the more complex system is that the communication between the companion RF device 140 and the mobile RF device 110 should work in both directions. The companion RF device 140 may not have the space and weight constraints associated with the mobile RF device 110, and may therefore contain a power source with greater capacity and a transmitter with a greater transmit range 150 than the mobile RF device 110. In this case, the mobile RF device 110 may receive a message and transmit a response that is not received by the companion RF device 140 because of the limited transmit range 120.

A difficulty with unlicensed public use of this more complex system using low power transmission is that the transmit ranges 120, 150 may be limited to a few hundred feet. Additionally, receiving messages on a frequency band used by other traffic often leads to RF interference and unwanted messages, and may necessitate inclusion of an identifying code and use of a technique to verify the validity of a message.

The wireless telecommunications infrastructure may also be used for radio tracking. The existing radio allocations, which have enough power to be effective, authorize wireless companies to create and maintain various wireless telecommunications infrastructures. Devices used in these infrastructures include, but are not limited to: cellular telephones, two-way pagers, and devices that use the general packet radio service.

One system uses a specialized cellular telephone that has a built-in global positioning system receiver. A user can call the cell phone number issued by the telephone company, and the specialized cell phone transmits the GPS coordinates of the device. For use in location tracking of people, the device can be disguised as a watch or can be otherwise concealed. Unfortunately, such specialized devices are very expensive, often beyond the reach of those who could most use such technology. The cost of location systems using the cellular telephone network may be not only the purchase of the device, but also may be a recurring monthly service charge. In addition, wireless telecommunications service may not be reliable when the cell phone is within a structure or the signal is otherwise obstructed, and the wireless service may not be available in rural and/or in remote areas.

What is needed is an apparatus, method, and system that can locate a transceiver by using RF communications and radio services. Use of RF communications and radio services for location monitoring may eliminate a cellular telephone recurring charge, and may be available in all parts of the country. The apparatus and system needs to be available for use by the unlicensed general public within the limits of government regulations, and the transmission range should be extended well beyond a few hundred feet. The apparatus needs to conserve energy, providing a long effective life without requiring a large power source. The apparatus and system needs to be effective in spite of RF interference and physical obstacles that attenuate RF signals. Additionally, the tracking system needs to be inexpensive, such that all segments of society can afford to own and use it. Moreover, the system should not require a large infrastructure requiring constant maintenance by paid employees.

SUMMARY OF THE INVENTION

The present invention has been developed in response to the present state of the art, and in particular, in response to the problems and needs in the art that have not yet been fully solved by currently available RF location systems. Accordingly, the present invention has been developed to provide an apparatus, method, and system for locating a transceiver using RF communications and radio services that overcome many or all of the above-discussed shortcomings in the art.

An RF transceiver apparatus is provided with an enclosure containing a plurality of modules configured to functionally execute the necessary steps for responding to a location request. These modules in the described embodiments include a receiver module, a control module, and a transmitter module. In certain embodiments, the RF transceiver may also include a GPS module.

The apparatus, in one embodiment, contains a receiver module that receives an RF signal, determines a serial number, and determines whether the signal originated from a companion device or a foreign transceiver. A transmitter module transmits an RF signal using either high power or low power as selected by the control module. The control module verifies that a message is valid by matching the serial number with a list of valid numbers, and then responds by causing the transmitter module to send a low power transmission containing an identification code along with signals enabling the companion device to determine a separation distance, or alternately by causing the transmitter module to send a high power transmission containing the station identifier received from the foreign transmitter along with signals enabling the foreign transmitter operator to determine bearing and distance. The high power transmission may include the identification code. Since the high power transmission is sent in response to a message from a licensed radio operator and contains the licensed control operator's station identifier, the general public under applicable government regulations may use the apparatus.

The apparatus is further configured, in one embodiment, to transition into a power conservation mode after a period of time during which no valid messages are received. In the power conservation mode, the receiver may be operated at periodic intervals and other operations are ceased. Upon detection of a valid message, the apparatus transitions into a normal operating mode.

In one embodiment, after a period of time during which no valid messages are received while in the power conservation mode, the apparatus is configured to respond to a general call code sent by a foreign transmitter. The general call code is, as used herein, a specialized serial number included in the list of valid numbers for all implementations of the apparatus. The general call is preferably included in a message which also includes the station identifier of the foreign transmitter. A message sent by the apparatus in response to the general call code may be transmitted at high power and may contain the station identifier received from the foreign transmitter as well as location information. This feature allows the apparatus to respond to a foreign transmission that does not contain the device's serial number, thus allowing detection and location of the apparatus by a radio operator that may not be directly involved in a particular organized search.

The apparatus is further configured, in another embodiment, to contain a permanent power source that is tamper resistant and non-removable, and a removable power source that may be rechargeable and may be replaced. In normal operation, the removable power source provides power for all operations. In a power conservation mode, the apparatus first utilizes the power in the removable power source, and then uses power from the permanent power source. This feature prevents the disabling of the apparatus by removing the removable power source.

The apparatus is further configured, in another embodiment, to contain a GPS receiver that may determine location by processing signals originating from orbiting satellites. The GPS coordinates may be included in low and/or high power transmissions.

The apparatus is further configured, in another embodiment, to contain one or more sensors that cause a low power transmission to be sent in response to a sensor exceeding a threshold. Sensors may include pushbuttons, medical monitors, battery power meters, accelerometers, microphones, and the like. This feature may provide a mechanism for monitoring the status of a person, animal, or object that is within the low power transmission range of the apparatus.

A system of the present invention is also presented for monitoring the location of a mobile RF transceiver. In particular, the system, in one embodiment, includes a mobile RF transceiver, a companion device, and a foreign transceiver.

The mobile RF transceiver includes a receiver that detects a message and determines a serial number, a transmitter that sends a low power transmission in response to a valid message from the companion device and a high power transmission in response to a valid message from a foreign transceiver, and a control unit that causes either a unique identification to be transmitted to the companion device, or a station identifier received from the foreign transceiver to be transmitted to the foreign transceiver.

The companion device includes a receiver that receives an RF signal containing an identification code, a transmitter that transmits a low power RF signal containing a serial number, and a controller that determines a distance to the mobile RF transceiver and signals an alarm if the mobile RF transceiver exceeds a predetermined distance or does not respond.

The foreign transceiver transmits a message containing serial number or a general call code and receives a message containing the foreign transceiver's station identifier along with signals enabling the foreign transceiver operator to determine distance and bearing. The foreign transceiver may operate on the amateur radio (HAM) bands, commercial bands, police bands, and the like.

An application of the system of the present invention is the monitoring and locating of children. In particular, the system, in one embodiment, includes the attaching of a mobile RF transceiver to a child and monitoring the location of the child with the companion device and if necessary, searching for the child with one or more foreign transceivers.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
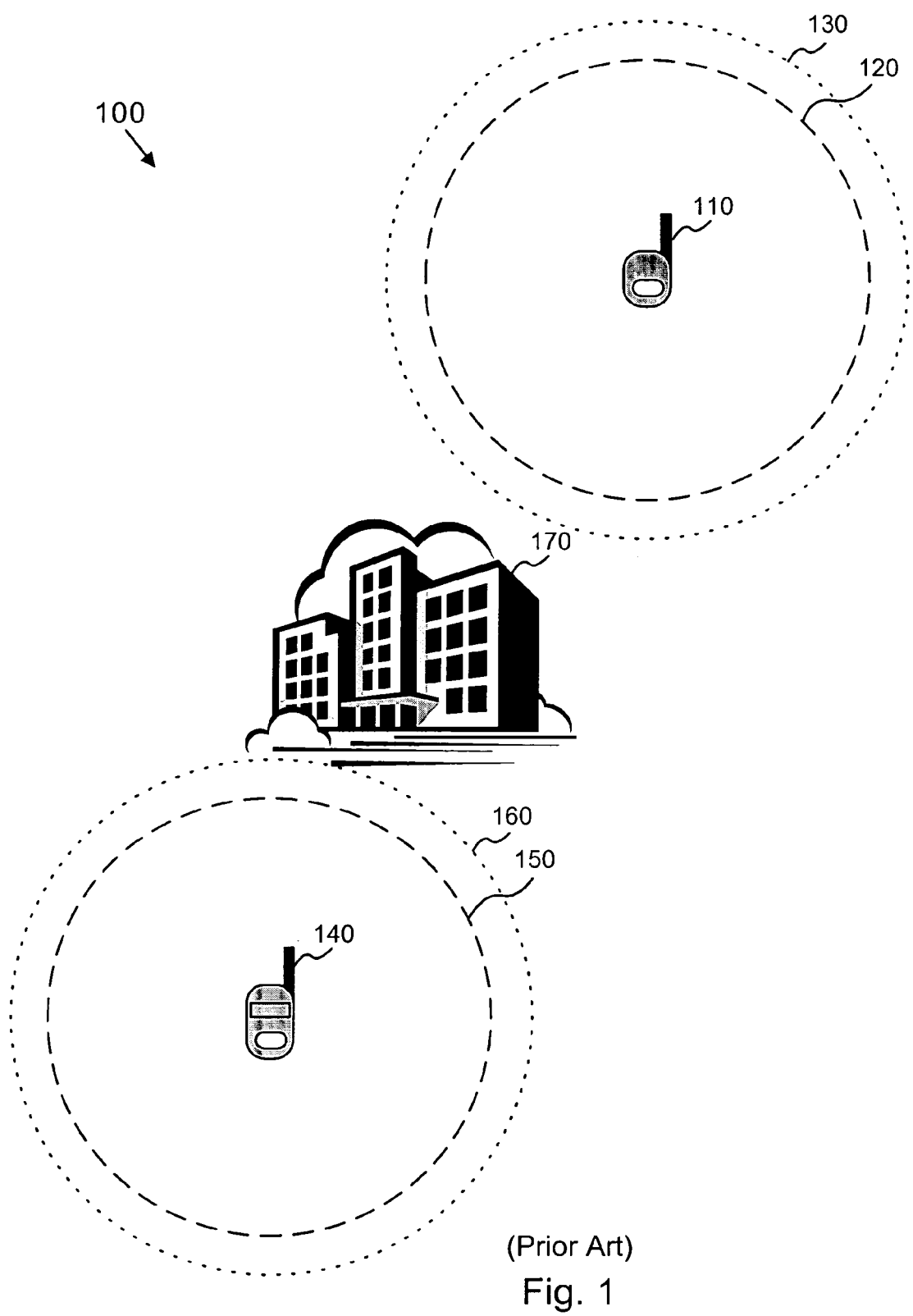
FIG. 1 is a schematic block diagram illustrating a typical RF tracking system.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

The present invention pertains to the monitoring and tracking of the location of a mobile RF transceiver. In a monitoring mode, a companion RF device transmits a message to a mobile RF transceiver, which in turn transmits back to the companion RF device. The companion RF device determines a separation distance, and may display the separation distance. If the separation distance exceeds a threshold or the mobile RF device does not respond, the companion RF device may signal an alarm. An attention signal may be also transmitted by the mobile RF device in response to a sensor exceeding a threshold or the closing of a switch.

In a search mode, a foreign transceiver employing greater transmitter power and a highly sensitive directional receiver may be used to locate the mobile RF transceiver. If the mobile RF transceiver detects a valid message from a foreign transceiver, it may respond with a high power transmission using the station identifier received from the foreign transceiver. Since the foreign transceiver operator is the controlling operator of the mobile RF transceiver's high power transmission, the present invention may be purchased and used by the general public without obtaining a special license.

Figure 2:
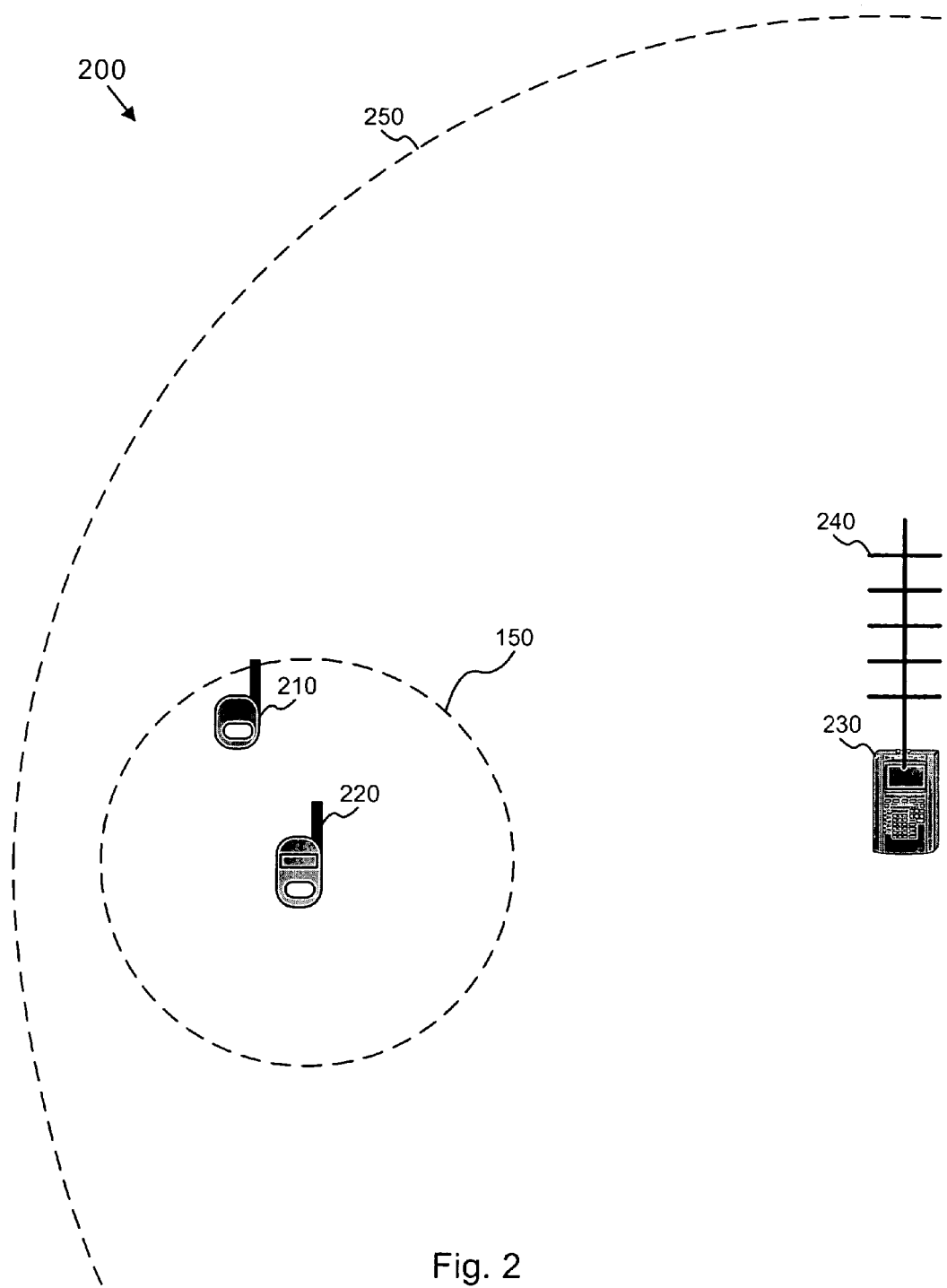
FIG. 2 is a schematic block diagram illustrating one embodiment of a monitoring mode of an RF transceiver locating system in accordance with the present invention.

FIG. 2 depicts a schematic block diagram illustrating one embodiment of a monitoring mode of an RF transceiver locating system 200. The RF transceiver locating system 200 includes a mobile RF device 210, a companion RF device 220 with a transmit range 150, and a foreign transceiver 230 equipped with a high gain directional antenna 240 with a communication range 250. The foreign transceiver 230 may be an amateur radio (HAM) transceiver, a commercial band radio transceiver, a public safety band radio transceiver, a police band transceiver, a forestry conservation band radio transceiver, a government band radio transceiver, or the like.

In the monitoring mode the companion RF device 220 transmits a message including a serial number using a transmit power that is acceptable under government regulations for free use on a selected frequency band. Preferably, the serial number is unique to the mobile RF device 210. The match of the unique serial number with a list of valid serial numbers in the mobile RF device 210 establishes the validity of the message. The frequency band may be selected to permit use of an antenna that is compact and easily manufactured.

The mobile RF device 210 may respond if the message is received and the identification code is recognized to be valid, by transmitting an identification code along with location information using a transmit power that is acceptable for free use on the selected frequency band. Preferably, the identification code is unique. The identification code may be an address or serial number of the companion RF device 220, an address or serial number of the remote RF device 210, or a unique combination representing a relationship between the devices, and may be the same or different from a unique serial number sent by the companion RF device 220.

The location information may include the manner in which the signal is transmitted as well as or instead of actual location identifiers. In one embodiment, the location information may include multiple messages that permit the companion RF device 220 to measure a round-trip communication time and therefore to calculate a separation distance. In another embodiment, a return signal strength measurement may be used to calculate a separation distance. In another embodiment, the location information may include global positioning system (GPS) coordinates. The separation distance may be displayed on a readout located on the companion RF device 220 or may be otherwise represented visually or audibly.

The companion RF device 220 may include an actuator that initiates a distance measurement. It also may include an automatic monitoring mode wherein a distance measurement is periodically initiated. In some embodiments, if the measured separation distance exceeds a user configurable value, an audible and/or visual alarm is triggered. The alarm may also be triggered if an attention message is sent from the mobile RF device 210 or there is no response to a companion RF device 220 transmission.

Within the transmit range 150, the mobile RF device 210 responds to a valid message from the companion RF device 220. If the mobile RF device 210 travels outside of the transmit range 150 or the transmit signal strength is attenuated by an obstacle, the mobile RF device 210 may not receive a valid message, and hence may not respond. If the mobile RF device 210 does not receive a valid message during a predefined or user configurable period of time, the mobile RF device 210 may enter into a power conservation mode wherein power is used only for periodic sampling of RF activity.

The foreign transceiver 230 is equipped with, and may be licensed if necessary to use, a transmitter at a power level up to several orders of magnitude greater than the transmitter power level of the companion device 220. Consequently, the foreign transceiver 230 communication range 250 may be many times greater than the transmit range 150. The foreign transceiver's 230 greater transmit power may reduce RF interference and also penetrate obstacles that often attenuate RF signals. If the foreign transceiver 230 transmits a valid message on a frequency used by the companion RF device 220, the mobile RF device 210 will respond.

The mobile RF device 210 may determine that a valid message was transmitted by a foreign transceiver 230. In order to respond with a high power transmission, the mobile RF device 210 determines the station identifier of the foreign transceiver 230, and transmits a high power signal using the station identifier of the foreign transceiver 230. For example, a HAM station identifier would be the station call letters assigned by a government regulatory agency to the HAM operator. Other radio services may have differing methods to assign station identifier codes. Consequently, various forms of station identification codes may be used. Since the mobile RF device 210 does not operate at high power unless requested to do so by a licensed and qualified foreign radio operator, the licensed radio operator becomes the control operator of all high power operations; and hence the transmission may be authorized under government regulations. The current invention thus allows the regulatory-permitted transmission range of the mobile RF device 210 to be increased significantly.

In one embodiment, the mobile RF device 210 responds with a message including the station identifier of the foreign transceiver 230 and a series of periodic bursts of RF activity. The high gain directional antenna 240 may be used to determine the direction and distance to the mobile RF device 210. In another embodiment, the mobile RF device 210 responds with a message including the station identifier of the foreign transceiver 230 and a set of GPS coordinates.

Figure 3:
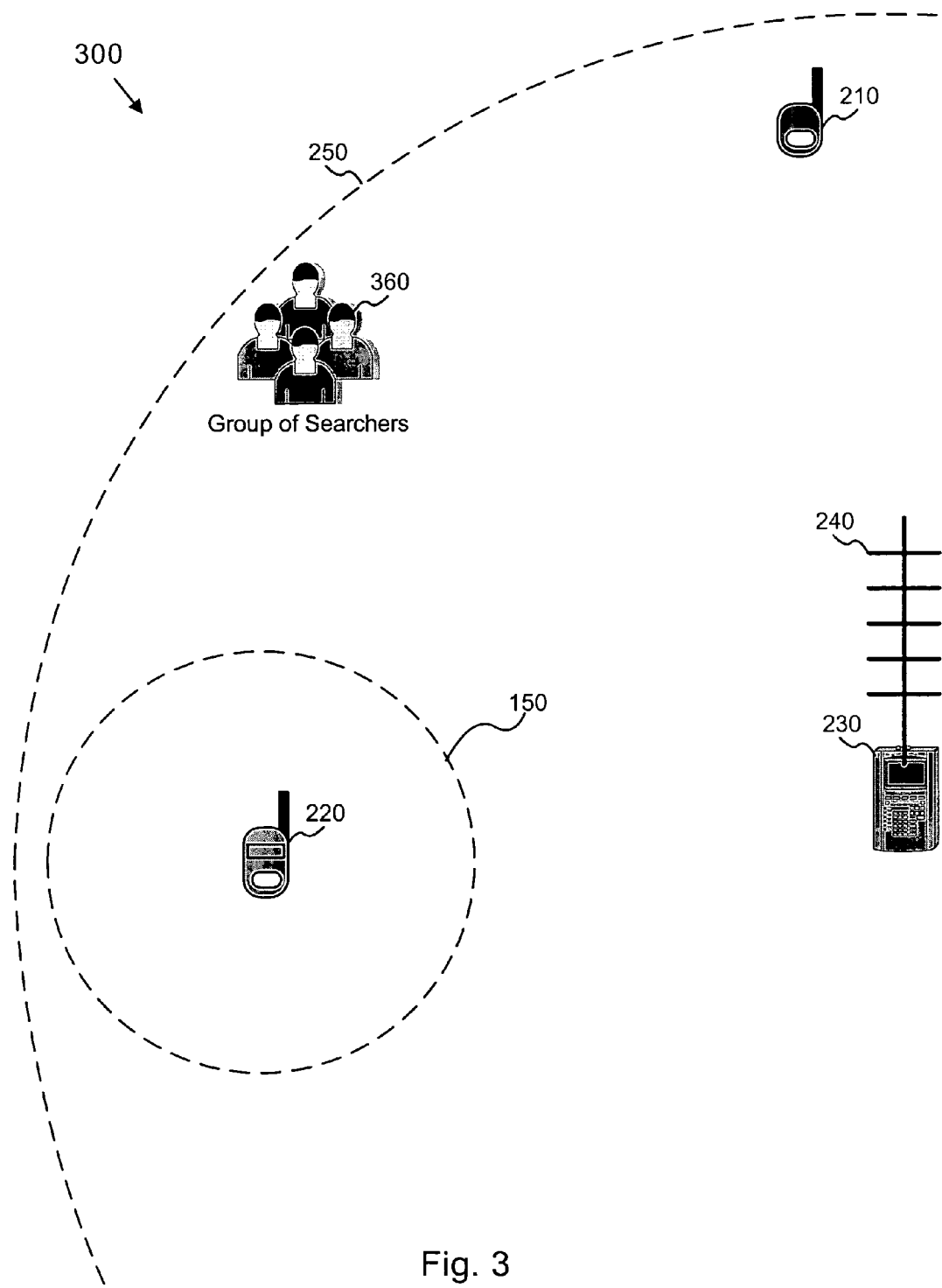
FIG. 3 is a schematic block diagram illustrating one embodiment of a search mode of an RF transceiver locating system in accordance with the present invention.

FIG. 3 depicts a schematic block diagram illustrating one embodiment of a search mode of an RF transceiver locating system 300. The RF transceiver locating system 300 includes a mobile RF device 210, an companion RF device 220 with a transmit range 150, a foreign transceiver 230 equipped with a high gain directional antenna 240 and communication range 250, and a group of searchers 360.

The search mode is entered when the companion RF device 220 is not able to determine a distance to the mobile RF device 210, generally due to the mobile RF device 210 moving beyond the transmit range 150. In some embodiments, the companion RF device 220 may attempt multiple times to evoke a response from the mobile RF device 210. Failure to elicit a response may cause the user of the companion RF device 220 to start a search. One search technique may be to search by assuming a possible search direction and periodically attempting to determine a separation distance using the companion RF device 220. Another search technique may be to call for help from a foreign transceiver 230 and/or a group of searchers 360. The user of the companion RF device 220 may communicate the serial number of the mobile RF device 210 to an operator of the foreign transceiver 230.

The mobile RF device 210 may enter into a power conservation mode upon the lapse of a predetermined period of time wherein no valid messages are received. In the power conservation mode, power may be used only for periodic sampling of RF activity. If RF activity is detected, the mobile RF device 210 determines if the RF signal constitutes a valid message. If a valid message is received from the companion RF device 220, a low power response message may be transmitted including a unique identification code as well as location information. If a valid message is received from the foreign transceiver 230, a high power response message may be transmitted including the foreign transceiver 230 station identifier as well as location information. In one embodiment, the high power response message may be transmitted using continuous wave Morse code to increase the transmit range.

In a certain embodiment, upon the lapse of a predetermined period of time wherein no valid messages are received, the mobile RF device 210 may respond to a foreign transceiver 230 general call code as well as a foreign transceiver 230 message containing a matching serial number. This feature may allow a search to begin before all search operators using a foreign transceiver 230 have been informed of the matching serial number. The feature may also be useful as a means of obtaining search information from an operator of a foreign transceiver 230 that is not directly involved in the search.

The operator of the foreign transceiver 230 may determine distance and bearing to the mobile RF device 210 using the high gain directional antenna 240. The foreign transceiver 230 may also direct the group of searchers 360 toward the location of the mobile RF device 210. For example, the RF signal from the mobile RF device 210 may be strongest at the top of a hill or building, while the mobile RF device 210 may be located on the ground or within a structure.

A representative example of a use of the RF transceiver location system 200 (See FIG. 2) is the monitoring and location of a lost or abducted child. The mobile RF device 210 may be affixed to a child, who may then roam freely within a boundary determined by the transmit range 150 of the companion RF device 220. The user of the companion RF device 220 may initiate periodic separation distance measurements, or transition to an automatic monitoring mode that initiates periodic measurement of the separation distance.

The child may initiate an attention message from the mobile RF device 210 by pressing a button, or by a sensor value exceeding a threshold, or the like. Similarly, if the child falls into a hole, enters into a structure, or wanders beyond the transmit range 150 of the companion RF device 220, an alarm may be triggered. The parent or other user of the companion RF device 220 may start to search probable places where the child might be located, using the companion device 220 to sense whether the child is within range, measure the separation distance, and obtain an approximate direction to the child. The parent may also call for help from a group of HAM operators, police, emergency services personnel, and the like.

One or more radio operators may search the general location where the child was lost, using high power RF signals to penetrate into structures, mine shafts, wells, and so forth. In coordination with search and rescue teams, other radio operators may set up RF search locations on tall buildings or other high elevation locations, and still other radio operators may quickly scatter over a wide search area. If the search proves unsuccessful, for instance in the event of an abduction, a message could be sent, for example, to a nation-wide community of amateur radio enthusiasts, alerting them to look for a response to a general call code from the mobile RF device 210 using their station identifier code. Because the mobile RF device 210 enters into a power conservation mode soon after it stops receiving valid messages, the mobile RF device 210 may remain active for many months or even years.

Those skilled in the art will recognize other applications for the RF transceiver locating system in the tracking of vehicles, pets, mobile equipment, animals, inventory, and the like. Applications also exist in tracking lost or stolen property.

Figure 4:
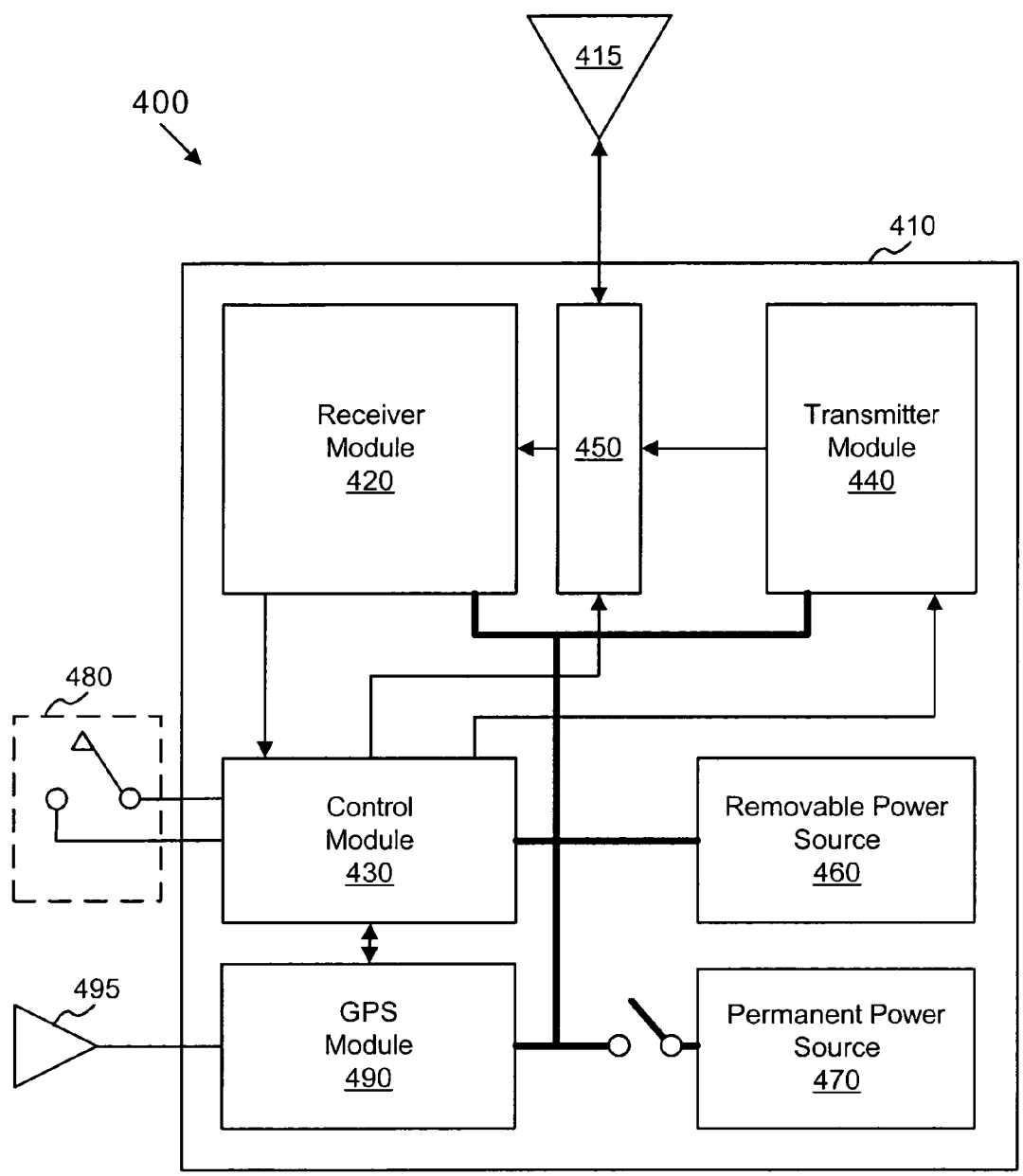
FIG. 4 is a schematic block diagram illustrating one embodiment of an RF transceiver in accordance with the present invention.

FIG. 4 depicts a schematic block diagram illustrating one embodiment of an RF transceiver 400. The RF transceiver 400 includes an enclosure 410, an antenna 415, a receiver module 420, a control module 430, a transmitter module 440, a send/receive switch 450, a removable power source 460, a permanent power source 470, a sensor 480, a GPS module 490, and a GPS antenna 495.

The enclosure 410 may be constructed of durable materials such as molded plastic or metal that provide a tamper-resistant case to enclose other components. The enclosure may be sealed to prevent tampering and eliminate moisture. The antenna 415 may act as a transmit and a receive antenna and may be embedded within the enclosure or rigidly affixed thereto. The control module 430 activates the send/receive switch 450 that acts to either connect the transmitter output or the receiver input to the antenna 415.

The receiver module 420 amplifies, filters, and decodes the RF signal from the antenna 415. The receiver module 420 may also examine the decoded output to determine a serial number. The receiver module 420 may also determine whether the decoded output represents a valid message from a companion RF device 220 or from a foreign transceiver 230 (see FIG. 2). For example, a valid message may contain a serial number corresponding to a number assigned to the RF transceiver. In addition, upon the lapse of a predetermined period of time wherein no valid messages are received, a message from a foreign transceiver 230 containing a general call code may be considered valid.

The control module 430 may respond to a valid message from a companion RF device 220 by selecting a low power output signal from the transmitter module 440 and sending a unique identification code to the transmitter module 440. Also, the control module 430 may respond to a valid message from a foreign transceiver 230 by selecting a high power output signal from the transmitter module 440 and sending the foreign transceiver's 230 station identifier to the transmitter module 440.

In one embodiment, the control module 430 determines an elapsed time since a previous valid message and transitions to a power conservation mode if the elapsed time exceeds a predetermined or user configurable value. The lack of valid messages is typically an indication that the RF transceiver 400 is no longer within transmit range 150 of the companion RF device 220. In the power conservation mode, the control module 430 may cause the receiver module 420 to cease continuous operation, enabling the receiver module 420 to monitor RF signals on a periodic basis. If RF activity is detected, the control module 430 may exit the power conservation mode.

Additionally, in the power conservation mode, the control module 430 may respond to reception of a general call message from a foreign transceiver 230 by causing the transmitter module 440 to transmit a message containing the foreign transceiver's 230 station identifier as well as location information using high power. In one embodiment, continuous wave Morse code is used for the high power transmission.

In normal operation, power is provided by the removable power source 460. In one embodiment, the removable power source 460 may include removable or rechargeable batteries. In one embodiment, the permanent power source 470 is tamper-resistant and non-removable to prevent a disabling of the apparatus by causing a power failure. In the power conservation mode, the permanent power source 470 may be connected to the power grid of the RF transceiver 400 upon exhaustion of the removable power source 460.

The transmitter module 440 may selectively transmit RF signals using either high power or low power, based upon signals from the control module 430. In one embodiment, the transmitter module 440 transmits a high power RF signal at least in part using continuous wave Morse code to improve the transmit range. In one embodiment, in response to a valid message from a foreign transceiver 230, the transmitter module 440 transmits a periodic series of short bursts of high power RF energy, enabling the foreign transceiver 230 operator to determine distance and bearing to the RF transceiver 400. In another embodiment, the high power transmission frequency may be different from the low power transmission frequency.

Activation of the sensor 480 may cause the transmitter module 440 to transmit a low power attention message to the companion RF device 220. In one embodiment the sensor 480 may be a pushbutton. In another embodiment, the sensor 480 may be a medical health monitor. In another embodiment, the sensor 480 may be an accelerometer. In another embodiment, the sensor 480 may be a microphone. In another embodiment, the sensor 480 may be a battery power indicator. In some embodiments, the attention signal contains sensor information.

The GPS module 490 may determine location by examining signals received by the GPS antenna 495 from satellites orbiting the earth. Location information from the GPS module 490 may be included in messages sent by the transmitter module 440 in either low power or high power transmissions. The GPS module 490 and associated GPS antenna 495 may be eliminated to conserve power and eliminate cost.

Figure 5:
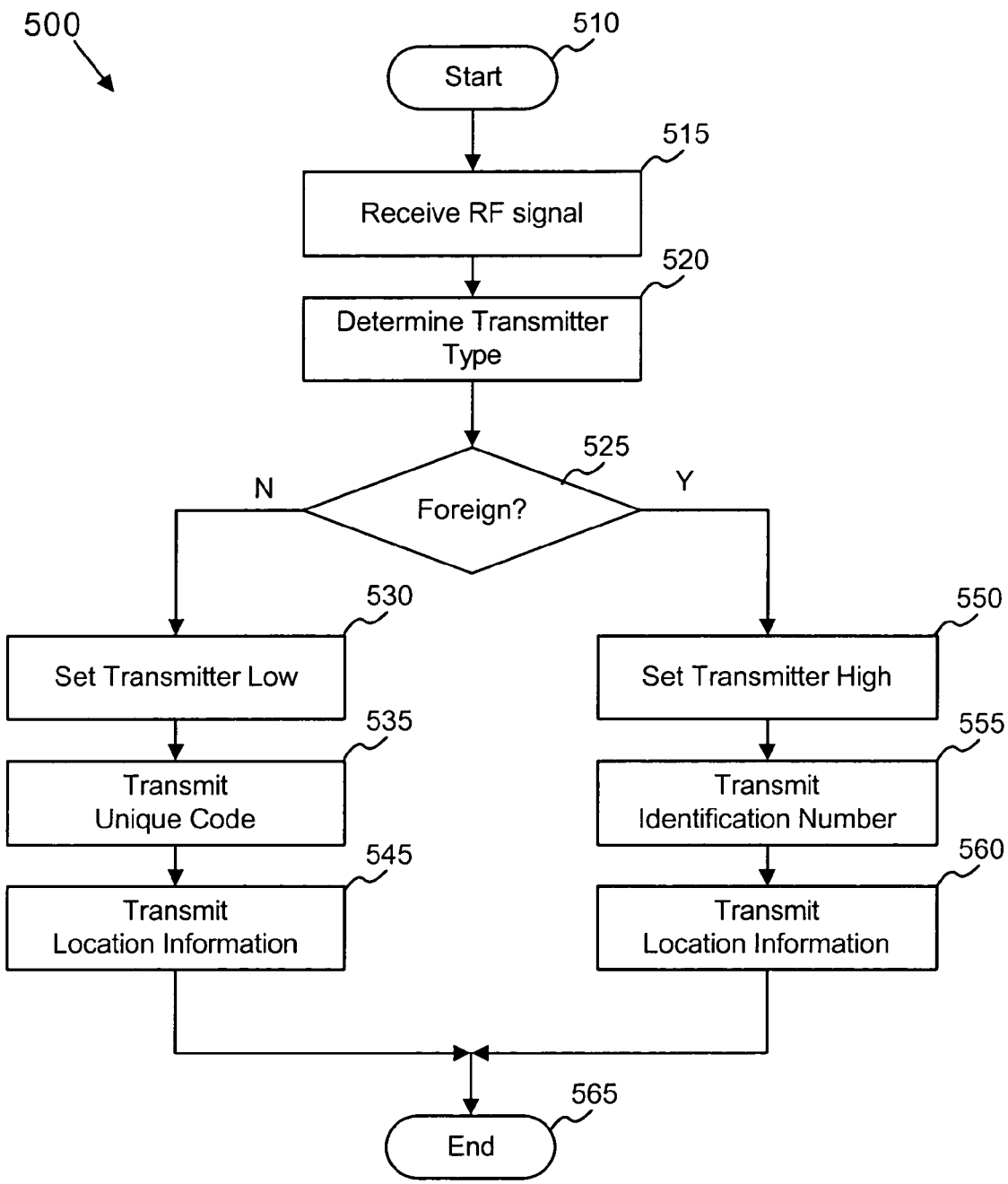
FIG. 5 is a schematic flow chart diagram illustrating one embodiment of car a method for responding to a location request in accordance with the present invention.

FIG. 5 depicts a schematic flow chart diagram illustrating one embodiment of a method 500 for responding to a location request in accordance with the present invention. The location request may originate from a companion RF device 220 or a foreign transceiver 230 (See FIG. 2). The method 500 may be embodied in a mobile RF device similar to the mobile RF device 210 of FIG. 2, which is attached to a person, animal, or object that a user desires to locate.

The method 500 starts 510 when power is supplied to the mobile RF device. The method 500 receives 515 an RF signal by amplifying, filtering, demodulating, and decoding as necessary to produce a digital representation of at least portions of the message content. The method 500 then determines 520 the transmitter type by examining the message configuration of the RF signal.

If method 500 determines 525 that the message was not sent by a foreign transmitter but sent by a companion device such as the companion RF device 220 of FIG. 2, the method 500 sets 530 a transmitter like the transmitter module 440 of FIG. 4 to transmit at low power. Then the method 500 transmits 535 a unique identification code and subsequently transmits 545 location information. In one embodiment, the location information includes Global Positioning System (GPS) coordinates. In another embodiment, the location information includes the exchange of multiple RF messages that permits a companion receiver to determine a communication transit time and thus determine a separation distance. In another embodiment, location information is embodied in the RF signal strength, measurement of which permits a determination of a separation distance. The method 500 then ends 565.

If method 500 determines 525 that the message was sent by a foreign transmitter such as the foreign transceiver 230 of FIG. 2, the method 500 sets 550 a transmitter like the transmitter module 440 of FIG. 4 to transmit at high power. Then, the method 500 transmits 555 the station identifier received from the foreign transmitter 230, such as call letters received from a HAM radio, and subsequently transmits 560 location information. In one embodiment, the location information may include Global Positioning System (GPS) coordinates. In another embodiment, the location information may include a series of periodic bursts of RF energy that permits a receiver to determine distance and bearing. The method 500 then ends 565.

Figure 6:
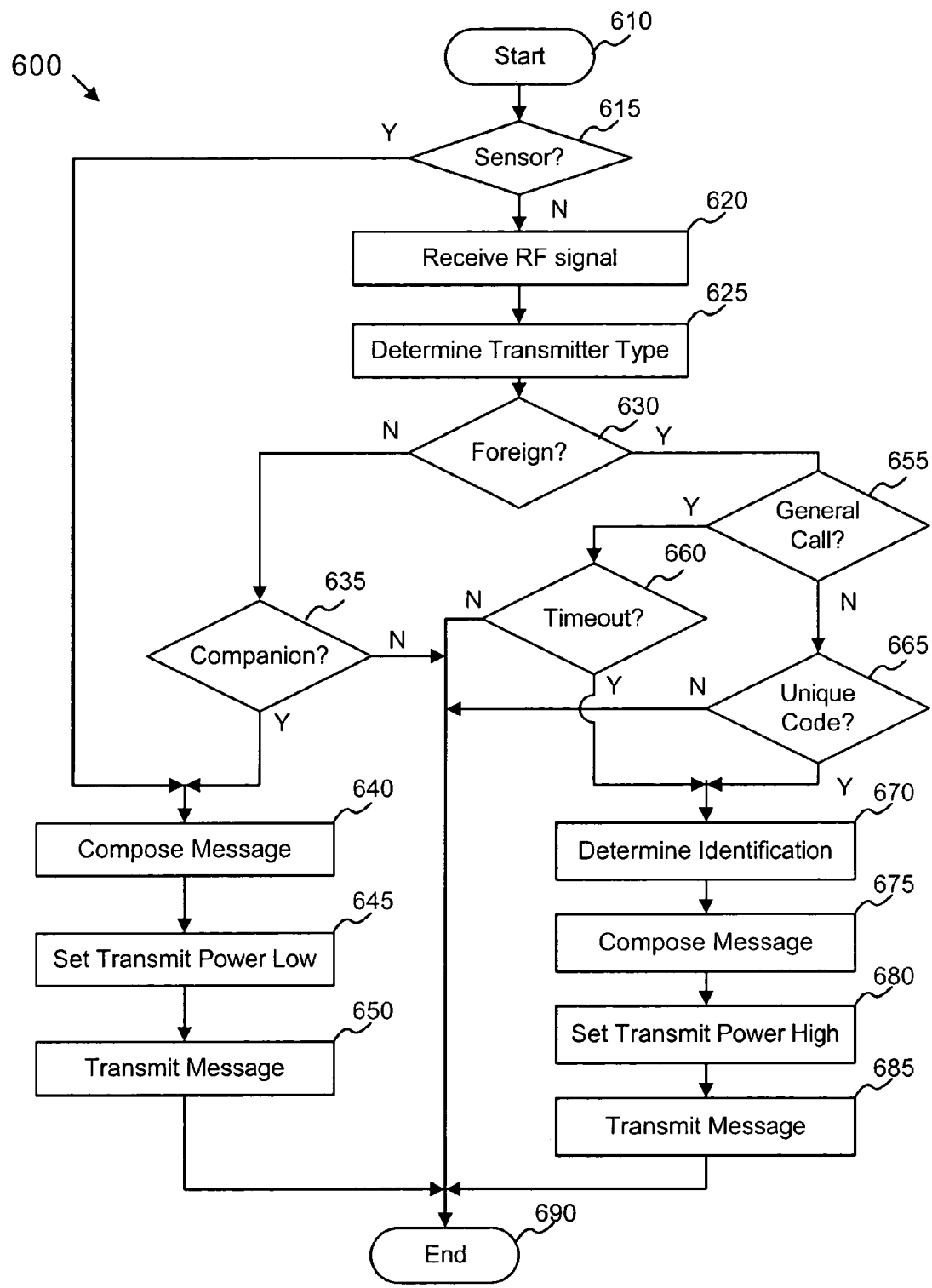
FIG. 6 is a schematic flow chart diagram illustrating an alternate embodiment of a method for responding to a location request in accordance with the present invention.

FIG. 6 depicts a schematic flow chart diagram illustrating an alternate embodiment of a method 600 for responding to a location request from a companion RF device or a foreign transceiver in accordance with the present invention. The method 600 may be embodied in a mobile RF device similar to the mobile RF device 210 of FIG. 2, which is attached to a person, animal, or object that a user desires to locate.

The method 600 starts 610 when power is supplied to the mobile RF device. The method 600 examines one or more sensors to determine 615 if a threshold has been exceeded. In one embodiment the sensor is a pushbutton. In another embodiment the sensor is a medical condition monitor. In another embodiment the sensor is an accelerometer, motion detector, or microphone. In another embodiment the sensor is a battery power indicator.

If a threshold associated with the sensor has been exceeded, the method 600 composes 640 a message containing at least a unique identification code and location information, sets 645 a transmitter similar to the transmitter module 440 of FIG. 4 to transmit at low power, transmits 650 the message, and then ends 690. The sensor may be manually activated, for instance, if the mobile RF device is attached to a child and the child becomes frightened or hurt. The sensor may be automatically activated to indicate a problem condition. Examples may include an indication that a battery power is low, a blood sugar level is high, an object has been moved, and the like.

In one embodiment, the location information includes Global Positioning System (GPS) coordinates. In another embodiment, the location information includes the exchange of multiple RF messages that permits a companion receiver to determine a communication transit time and thus determine a separation distance.

If the method 600 determines 615 that no sensor threshold has been exceeded, an RF signal is received 620 by amplifying, filtering, demodulating, and decoding as necessary to produce a digital representation of at least a portion of the message content. The method 600 then determines 625 the transmitter type by examining the message configuration of the RF signal.

If method 600 determines 630 that the message was not sent by a foreign transmitter, the message is further examined to determine if the serial number corresponds an entry in a list of valid serial numbers. If the method 600 determines 635 that message is not valid, the method 600 ends 690. If the method 600 determines 635 that the message is valid, the method 600 composes 640 a message containing at least a unique identification code and location information, sets 645 a transmitter similar to the transmitter module 440 of FIG. 4 to transmit at low power, transmits 650 the message, and then ends 690.

If method 600 determines 630 that the message was sent by a foreign transmitter such as the foreign transceiver 230 of FIG. 2, the method 600 determines if the message contains a general call code. If the message contains 655 a general call code, the method 600 examines the state of a device embodying the method. If the method 600 determines 660 that the device has received a valid message within a predetermined, or user configurable, time period (i.e. the time period has not timed out), the method ends 690. If the device has not received a valid message in the predetermined or user configurable time period, the method 600 determines 670 the station identifier of the foreign transmitter and composes 675 a message containing at least the station identifier of the foreign transmitter and location information. In one embodiment, the location information includes a series of periodic bursts of RF energy that permits a receiver to determine distance and bearing.

The method 600 then sets 680 a transmitter similar to the transmitter module 440 of FIG. 4 to transmit at high power. Then, the method 600 transmits 685 the message and subsequently ends 690. In one embodiment, the high power message is transmitted at least in part using continuous wave Morse code.

If the message does not contain 655 a general call code, the method 600 further examines the message to determine if it contains a serial number matching an entry in a list of valid serial numbers. If the message does not contain 665 a matching serial number, the method 600 ends 690. If the message contains 655 the a matching serial number, the method 600 determines 670 the station identifier of the foreign transmitter and composes 675 a message containing at least the station identifier of the foreign transmitter and location information. The method 600 then sets 680 a transmitter similar to the transmitter module 440 of FIG. 4 to transmit at high power, transmits 685 the message, and subsequently ends 690.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for transmitting and receiving a Radio Frequency (RF) signal, the apparatus comprising:
    a receiver module configured to receive an RF signal, decode a serial number contained in the RF signal, and determine whether the RF signal originated from a companion device or from a foreign transmitter;
    a transmitter module configured to selectively transmit a message using a low power RF signal and a high power RF signal; and
    a control module configured to respond to a message containing a matching serial number originating from the companion device by sending a low power RF transmission containing an identification code, and to a message containing a matching serial number originating from the foreign transmitter by sending a high power RF transmission containing a station identifier of the foreign transmitter; and
    wherein the foreign transmitter comprises an amateur radio (HAM) transmitter and the station identifier comprises call letters allocated to the operator of the HAM transmitter.

2. The apparatus of claim 1, wherein the foreign transmitter comprises a transmitter selected from the group consisting of an amateur radio (HAM) transmitter, a commercial band radio transmitter, a public safety band radio transmitter, a police band transmitter, a forestry conservation band radio transmitter, and a government band radio transmitter.

3. The apparatus of claim 1, wherein the control module further comprises a timer configured to determine a time interval since the transmitter module transmitted a most recent message.

4. The apparatus of claim 3, wherein the control module is configured to enter into a power conservation mode if the time interval exceeds a predetermined value.

5. The apparatus of claim 4, wherein during the power conservation mode the control module halts the transmitter module and operates the receiver module at periodic intervals to monitor for RF signals.

6. The apparatus of claim 5, wherein the control module is configured to exit the power conservation mode in response to detection of RF signals by the receiver module.

7. The apparatus of claim 3, wherein the control module is further configured to respond to a general call code from the foreign transmitter if the time interval exceeds a predetermined value, by sending a message containing at least the station identifier of the foreign transmitter.

8. The apparatus of claim 1, further comprising a permanent power source and a removable power source, the permanent power source being utilized in response to exhaustion of the removable power source.

9. The apparatus of claim 8, wherein the permanent power source is tamper-resistant and non-removable.

10. The apparatus of claim 1, wherein the high power RF transmission is transmitted at least in part using Morse code.

11. The apparatus of claim 1, further comprising a Global Positioning System (GPS) receiver.

12. The apparatus of claim 1, wherein the foreign transmitter comprises a HAM transmitter and the station identifier comprises call letters allocated to the operator of the HAM transmitter.

13. The apparatus of claim 1, wherein the low power RF transmission comprises information to permit the companion device to determine a distance to the apparatus.

14. The apparatus of claim 1, wherein the high power RF transmission comprises information to permit a foreign transmitter operator to determine a bearing and distance to the apparatus.

15. The apparatus of claim 14, wherein the information comprises a periodic series of short bursts of energy.

16. The apparatus of claim 1, wherein the transmitter is further configured to transmit the low power RF transmission at a first frequency and the high power RF transmission at a second frequency.

17. The apparatus of claim 1, further comprising an actuator that when activated causes an attention message to be transmitted to the companion device.

18. The apparatus of claim 1, further comprising a sensor that when activated causes an attention message to be transmitted to the companion device.

19. A method for locating a mobile transceiver, the method comprising:
receiving an Radio Frequency (RF) signal comprising a serial number;
determining whether the RF signal originated from a companion device or a foreign transmitter;
selectively transmitting a message comprising a unique device identification code using a low power RF signal and a message comprising a station identifier of the foreign transmitter using a high power RF signal, in response to the RF signal originating from the companion device and from the foreign transmitter; and
wherein the foreign transmitter comprises an amateur radio (HAM) transmitter and the station identifier comprises call letters allocated to the operator of the HAM transmitter.

20. The method of claim 19, wherein the message using a high power RF signal is transmitted at least in part using continuous wave Morse code.

21. The method of claim 19, wherein the message using a low power RF signal permits the companion device to measure a round trip communication time and determine a separation distance.

22. The method of claim 19, wherein the message using a low power RF signal permits the companion device to measure signal strength to determine a separation distance.

23. The method of claim 19, wherein the message further comprises Global Positioning System (GPS) coordinates.

24. A system for monitoring the location of a mobile transceiver, the system comprising:
a mobile RF transceiver comprising:
a receiver configured to receive a Radio Frequency (RF) signal comprising a serial number;
a controller configured to determine whether the RF signal originated from a companion device or a foreign transmitter and to compose a message comprising a unique identification code and location information when responding to the companion device and a station identifier of the foreign transmitter and location information when responding to a foreign transmitter; and
a transmitter configured to selectively transmit a message using a low power RF signal and a high power RF signal, in response to the RF signal originating from a companion device and from a foreign transmitter;
a companion device comprising:
a receiver configured to receive a Radio Frequency (RF) signal comprising the unique identification code;
a controller configured to determine a distance to the mobile RF transceiver and further configured to signal an alarm if the mobile transceiver does not respond or if the distance to the mobile transceiver exceeds a predetermined threshold;
a transmitter configured to transmit a message using a low power RF signal comprising a serial number;
a foreign transceiver configured to transmit a message containing a station identifier and a serial number, and also to receive a message containing the transmitter station identifier and determine bearing and distance to the mobile RF transceiver; and
wherein the mobile RF transceiver is configured to conserve power by interrupting power to its transmitter and operating its receiver at periodic intervals to monitor for RF signals, the mobile RF transceiver control module further configured to respond to a message containing a general call code from the foreign transceiver if no valid message has been received during a predefined time period; and
wherein the foreign transmitter comprises an amateur radio (HAM) transmitter and the station identifier comprises call letters allocated to the operator of the HAM transmitter.

25. The system of claim 24 wherein the foreign transceiver comprises a transceiver selected from the group consisting of an amateur radio (HAM) transceiver, a commercial band radio transceiver, a public safety band radio transceiver, a police band radio transceiver, a forestry conservation band radio transceiver, and a government band radio transceiver.

26. The system of claim 24 wherein the mobile RF transceiver is attached to a child.

27. The system of claim 24 wherein the companion device further comprises a user interface comprising a distance readout, an actuator configured to initiate a distance measurement, and at least one alarm.

28. The system of claim 27 wherein the companion device further comprises an automatic monitoring mode wherein periodic distance measurements are initiated, and an alarm is activated if the mobile RF transceiver does not respond.

* * * * *